United States Patent [19]

Fuchs et al.

[11] Patent Number: 4,725,360

[45] Date of Patent: Feb. 16, 1988

[54] WORKING UP WASTEWATERS CONTAINING HYDROXYLAMINE OR ITS SALTS

[75] Inventors: Hugo Fuchs, Ludwigshafen; Erwin Thomas, Freinsheim; Franz-Josef Weiss, Neuhofen; Josef Ritz, Ludwigshafen, all of Fed. Rep. of Germany

[73] Assignee: BASF Aktiengesellschaft, Ludwigshafen, Fed. Rep. of Germany

[21] Appl. No.: 22,875

[22] Filed: Mar. 6, 1987

[30] Foreign Application Priority Data

Mar. 11, 1986 [DE] Fed. Rep. of Germany ....... 3607998

[51] Int. Cl.$^4$ .............................................. C02F 1/42
[52] U.S. Cl. .................................... 210/670; 423/387
[58] Field of Search ............... 210/670, 681, 284, 340, 210/341; 423/387

[56] References Cited

U.S. PATENT DOCUMENTS

| | | | |
|---|---|---|---|
| 3,568,833 | 3/1971 | Ritzen | 210/340 |
| 4,147,623 | 4/1979 | Koff et al. | 210/692 |
| 4,202,765 | 5/1980 | Koff et al. | 423/387 |

*Primary Examiner*—Ivars Cintins
*Attorney, Agent, or Firm*—Keil & Weinkauf

[57] ABSTRACT

Wastewaters containing hydroxylamine or its salts are worked up by a process in which the said wastewaters are passed over a strongly acidic ion exchanger, after which a 5–15% strength by weight aqueous sulfuric acid is passed over the said ion exchanger and a solution of hydroxylammonium sulfate in aqueous sulfuric acid is obtained.

5 Claims, No Drawings

WORKING UP WASTEWATERS CONTAINING HYDROXYLAMINE OR ITS SALTS

The preparation and processing of hydroxylamine and its salts frequently gives rise to wastewaters which contain hydroxylamine and its salts in low concentrations. However, disposal of such wastewaters causes difficulties in that they have an adverse effect on the treatment of wastewaters in conventional wastewater treatment plants. Although it is known that hydroxylamine can be decomposed by adding alkalis, hydrogen peroxide or nitrite, as described in Gmelin, Ammonium volume, pages 569-572, the decomposition with hydrogen peroxide is expensive, or that with alkalis or nitrite introduces into the wastewater other substances which have to be disposed of.

It is an object of the present invention to treat wastewaters requiring treatment and containing hydroxylamine or its salts in such a way that no difficulties are encountered during treatment together with other waste waters and furthermore no additional chemicals need be introduced.

We have found that this object is achieved by a process for working up wastewaters containing hydroxylamine and its salts, wherein the said wastewaters are passed over a strongly acidic ion exchanger, after which a 5-15% strength by weight aqueous sulfuric acid is passed over the said ion exchanger and a solution of hydroxylammonium sulfate in aqueous sulfuric acid is obtained.

The novel process has the advantages that hydroxylamine is removed in a simple manner from the wastewaters requiring treatment, no additional chemicals are introduced into the said wastewaters, and hydroxylamine is recovered in the form of hydroxylammonium sulfate which can be reused.

As a rule, the starting material used is a wastewater which contains from 0.1 to 10 g of hydroxylamine per liter, in the form of three hydroxylamine or its salts, such as the sulfate, nitrate or phosphate or the salts of lower fatty acids. Ammonium salts of the stated acids may also be present. The process has become particularly important for the treatment of wastewaters obtained in the production of hydroxylammonium sulfate, nitrate or phosphate by reducing nitric oxide or nitric acid in the presence of a noble metal catalyst. The typical wastewater obtained, for example, in the production of hydroxylammonium sulfate contains from 0.5 to 5 g/l of hydroxylamine in the form of hydroxylammonium sulfate and from 0.1 to 2 g/l of ammonium sulfate.

The wastewaters requiring treatment are passed over a strongly acidic ion exchanger. Suitable ion exchangers of this type contain, for example, sulfo groups. Ion exchangers consisting of crosslinked polystyrene possessing sulfo groups have proven particularly advantageous. The treatment is advantageously carried out at from 10 to 100° C. During the process, hydroxylamine is bound to the ion exchanger and, where a wastewater containing hydroxylammonium salts is used, a corresponding acidic solution is obtained, which in turn can be used for neutralization purposes.

When the capacity of the ion exchanger is exhausted, which is readily detectable at the exit from the content of hydroxylammonium ions, the wastewater feed is stopped and 5-15% strength by weight aqueous sulfuric acid is passed over this strong acid ion exchanger. Advantageously, from 1 to 10 l of 5-15% strength by weight aqueous sulfuric acid is used per l of acidic ion exchanger, after which the ion exchanger is advantageously washed with water. This gives a solution of, for example, from 5 to 100 g/l of hydroxylammonium sulfate in aqueous sulfuric acid, which may additionally contain ammonium sulfate if the wastewater used contains ammonium ions. As a rule, the content of ammonium sulfate is from 2 to 50 g/l. The solution thus obtained is advantageously used, together with further sulfuric acid, for the preparation of hydroxylammonium sulfate by hydrogenation of nitric oxide in the presence of a noble metal catalyst. It is also advantageous if the resulting aqueous sulfuric acid containing hydroxylammonium sulfate is fed to the hydroxylammonium sulfate solution obtained by hydrogenation of nitric oxide with hydrogen in the pr sence of a noble metal catalyst, and the solutions are worked up together, for example, are used for the oximation of cyclohexanone.

In a preferred embodiment, ion exchangers are used in pairs, in each case in an absorption zone and a desorption zone. When the capacity of the strongly acidic ion exchanger in the absorption zone is exhausted, the process is switched over to the next zone while sulfuric acid is passed over the exhausted ion exchanger to remove the hydroxylammonium ions. This operation is carried out alternately.

The Example which follows illustrates the process according to the invention.

EXAMPLE

A glass tube which has a diameter of 50 mm and is provided with a frit at the lower end is filled to a height of 1.5 m with an ion exchanger consisting of crosslinked polystyrene possessing sulfo groups, and activated with 5% (w/w) of aqueous sulfuric acid).

116 l of wastewater from the production of hydroxylamine, having a hydroxylamine content of 1.45 g/l, a sulfuric acid concentration of 0.2 g/l and an ammonium sulfate concentration of 0.5 g/l, are passed over the exchanger at a rate of 2,500 ml/h. During this process, the hydroxylammonium and ammonium ions are bound to the exchanger and the sulfate ions are obtained as an eluate in the form of sulfuric acid.

When the ion exchanger is treated with 6,500 ml of a 10% (w/w) of sulfuric acid and washed with about 3,000 ml of water, 8,550 ml of a hydroxylammonium sulfate solution containing 19.45 g/l of hydroxylamine, 48.06 g/l of sulfuric acid and 6.7 g/l of ammonium sulfate are obtained and the ion exchanger is regenerated at the same time. This solution is used together with fresh sulfuric acid in the synthesis of hydroxylamine.

We claim:
1. A process for removing hydroxylamine from waste-water containing hydroxylamine or its salts which comprises:
   passing said waste-water over a strongly acidic ion exchanger to bind the hydroxylamine to the ion exchanger, and thereafter
   passing 5-15% strength by weight aqueous sulfuric acid over said acidic ion exchanger to remove said hydroxylamine from the ion exchanger, whereby a solution of hydroxylammonium sulfate in aqueous sulfuric acid is formed.
2. The process of claim 1, wherein the starting material used is a wastewater which contains from 0.1 to 10 g/l of hydroxylamine in the form of hydroxylamine or its salts.

3. The process of claim 1, wherein two or more ion exchanger zones are used, wastewater and sulfuric acid being passed alternately over these zones.

4. The process of claim 1, wherein from 1 to 10 liters of 5–15% strength by weight aqueous sulfuric acid is passed over said ion exchanger per liter of the ion exchanger.

5. The process of claim 4, wherein the ion exchanger is washed with water after aqueous sulfuric acid is passed over the exchanger.

* * * * *